United States Patent Office 3,212,860
Patented Oct. 19, 1965

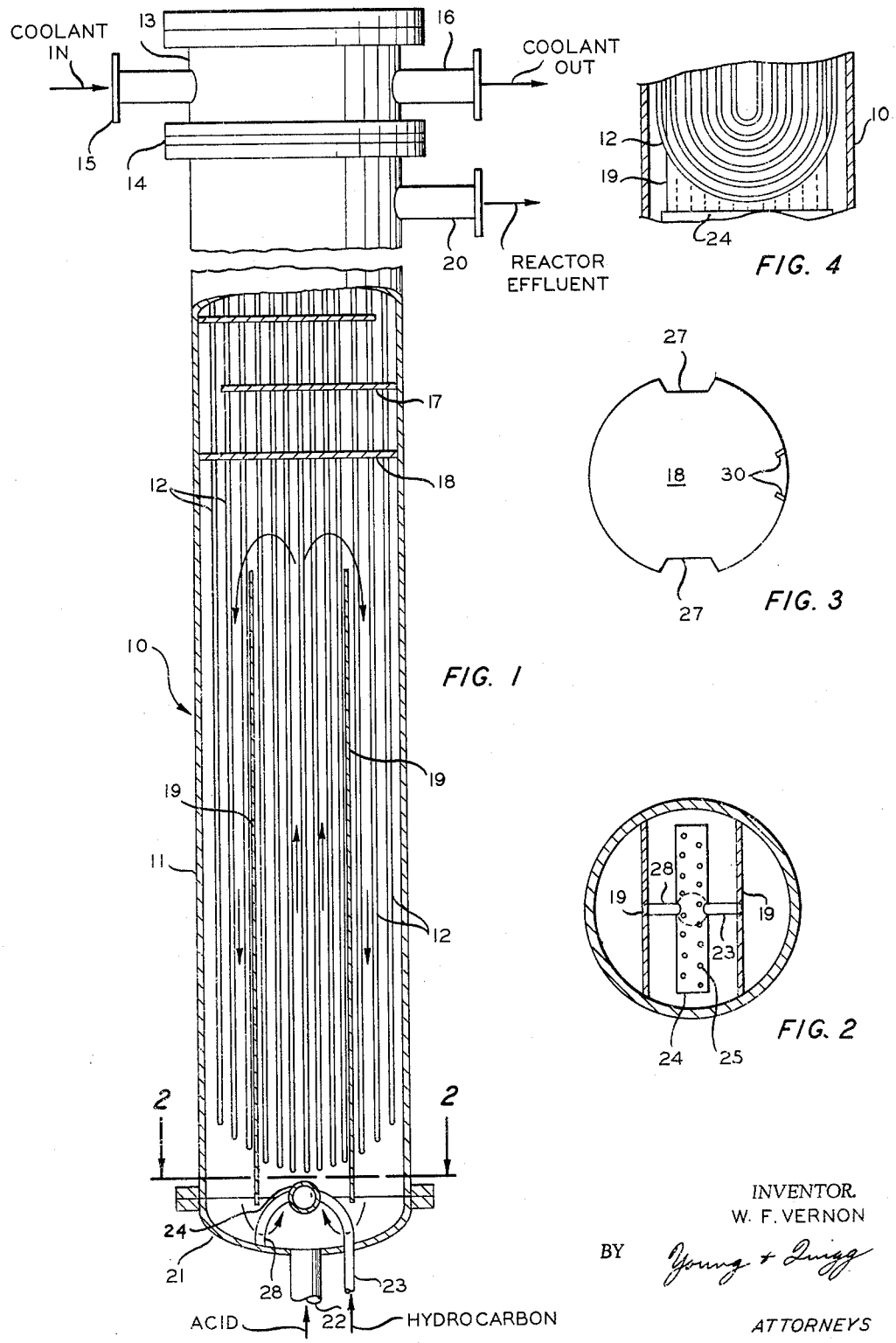

3,212,860
METHOD OF AND APPARATUS FOR
CONTACTING IMMISCIBLE FLUIDS
Walter Frank Vernon, Bartlesville, Okla., assignor to Phillips Petroleum Company, a corporation of Delaware
Filed Mar. 23, 1962, Ser. No. 182,004
8 Claims. (Cl. 23—285)

This invention relates to an improved method of and apparatus for intimately contacting at least two immiscible fluids. In a specific aspect, this invention relates to an improved alkylation process and apparatus therefor. In another specific aspect, this invention relates to a method of and apparatus for converting a standard U-tube heat exchanger into an alkylation reactor.

In the intimate contacting of immiscible fluids, a conventional method of insuring intimate contact comprises the employment of mechanically driven agitators. Other methods of intimately contacting immiscible fluids rely upon ducted internal circulation. In many reactions, and particularly in alkylation, effective temperature control in the reaction zone is quite critical and removal from or addition of heat to the reaction, as may be required, is an essential feature of the process, often dictating and limiting the design of the apparatus to be employed.

I have by my invention provided an improved method of and apparatus for contacting immiscible fluids. I have by my invention provided an improved method of and apparatus for contacting immiscible fluids wherein said contacting produces an exothermic reaction. I have by my invention provided an efficient alkylation reactor. I have further provided by my invention a method of and apparatus for converting the standard U-tube heat exchanger into an efficient alkylation reactor.

The conversion of the standard U-tube heat exchanger is effected by vertically positioning the standard U-tube heat exchanger so that the tube ends are in the lower portion of said heat exchanger. The horizontal baffles positioned in the lower region of the vertically positioned heat exchanger are removed. Two rows of tubes are removed and replaced by two vertical baffles, said vertical baffles positioned so as to provide three vertical compartments within said lower region. The heat exchanger head adjacent the tube ends is removed and replaced with a closure member containing a confined zone and having a fluid inlet means. This fluid inlet means includes a means of dispersing a fluid upwardly through the center vertical compartment of said three vertical compartments. The two vertical baffles extend downward from said lower region into the confined zone. Preferably, when the contact vessel is employed in the contacting of immiscible fluids producing an exothermic reaction, the dispersing means is positioned immediately adjacent to the tube end.

When employing the inventive contact vessel in the intimate contacting of two immiscible liquids, the liquid having the greater density is introduced into the vertical contact vessel. The second liquid is transmitted to the contact vessel through the fluid inlet means of the closure member and and dispersed upwardly throughout the cross section of the center vertical compartment. The pumping force exerted upon the second liquid causes said second liquid to jet upwardly through the center vertical compartment in intimate contact with the first liquid within the contact vessel. As the liquid mixture is emitted from the center vertical compartment, gravitational forces acting upon the immiscible mixture will cause the liquid of greater density to separate from the mixture, said liquid of greater density flowing downwardly through the vertical compartments positioned on either side of the center vertical compartment. The liquid of greater density flows downwardly through the vertical compartment and into the confined zone, flowing upwardly from the confined zone through the center vertical compartment with the second liquid transmitted to the contact vessel.

By positioning the dispersing means immediately adjacent to the tube ends, cooling or heating of the liquid mixture can be effected immediately upon contacting the first liquid with the second liquid.

The simplicity of the arrangement of construction which enables the employment of a standard heat exchanger reduces the cost of the contact vessel, thereby placing many contact processes economically within the reach of small operators. As U-tube heat exchangers have many applications, they enjoy the cost advantage of mass production. Therefore, in the employment of this equipment, my invention is of considerable importance.

Accordingly, it is an object of my invention to provide an improved method of and apparatus for contacting immiscible fluids.

Another object of my invention is to provide an improved method of and apparatus for contacting immiscible fluids wherein temperature control of the contact zone is critical to the contact process.

Another object of my invention is to provide an improved method of and apparatus for mixing immiscible fluids, at least one of which undergoes a thermally sensitive chemical transition in the presence of the other, with adequate temperature control.

Another object of my invention is to provide an improved alkylation process.

Other objects, advantages and features of my invention will be apparent to those skilled in the art upon the following discussion and the appended claims.

FIGURE 1 is a view of the contact vessel of my invention illustrating the lower portion in section.

FIGURE 2 is a cross-sectional view of the contact vessel of FIGURE 1 taken along the lines 2—2.

FIGURE 3 is a view of a horizontal baffle member.

FIGURE 4 is a cross-sectional view of a portion of the contact vessel of FIGURE 1.

Referring to FIGURE 1, there is shown a standard U-tube heat exchanger 10 adapted to serve as the inventive contact vessel. This contact vessel has a shell 11 housing a U-tube bundle indicated by tubes 12. These tubes open into a baffled header 13 which with plate 14 forms the closure for the upper end of vertical contact vessel 10. Header 13 is rotated 90° from its correct position with respect to U-tubes 12 positioned within shell 11 in order to illustrate coolant inlet 15 and coolant outlet 16. Partitions are positioned within header 13 so that a heat exchange medium entering through inlet 15 passes downwardly through tubes 12 and returns to a separate chamber in header 13, moving from header 13 through conduit outlet means 16. This arrangement is known as a two-pass exchanger. A number of baffle arrangements in header 13 are possible, thereby increasing the number of passes made by the heat exchange medium.

Conventional baffles 17 are spaced alternately on opposite sides of the shell in the upper region of the contact vessel so that fluid passing through the open volume of the shell describes a tortuous path. This increases mixing and heat exchange. In the adaptation of a conventional heat exchanger, the horizontal baffled region of the shell preferably comprises less than 40 volume percent of said shell. The contact vessel is provided with a shell conduit outlet 20. The portion of the contact vessel described thus far is conventional apparatus.

A baffle member 18 is fabricated so as to aid in the separation of the component having the greater density from the upward flowing mixture. Reference is made to FIGURE 3 wherein baffle 18 is illustrated, said baffle member 18 positioned within shell 11 so that openings 27 are positioned between hereinafter described vertical baffle plate members 19. Baffle member 18 will also contain holes, not herein illustrated, for the passage of U-tubes 12. Guide slots 30 are provided whereby baffle member 18 can be readily positioned within shell 11.

The bottom of the contact vessel shell is closed by a head 21. Head 21 contains a conduit inlet means 22 and a conduit inlet means 23 operably connected to a dispersing means 24. It is within the scope of this invention to position conduit inlet means 22 other than illustrated. For example, conduit inlet means 22 can be positioned so as to introduce a fluid into one of the vertical compartments hereinafter described. Dispersing means 24 comprises preferably a means of dispersing a fluid throughout the cross section of the vertical compartment and upwardly through multiple orifices. A fluid passed to dispersing means 24 via conduit means 23 will pass upwardly from dispersing means 24 via perforations 25.

Vertical baffle members 19 are positioned within the lower region of contact vessel 10, thereby apportioning the lower region of contact vessel 10 into three vertical compartments. Baffle members 19 extend downwardly beyond the extension of the U-tubes and below the dispersing region of dispersing means 24. Baffle members 19 are positioned so as to provide a separation zone between said baffle members 19 and baffle member 18. Reference is made to FIGURE 4 wherein the relative positioning of vertical baffle members 19 with respect to U-tubes 12 and dispersing means 24 is illustrated. FIGURE 4 is a cross-sectional view of a portion of the contact vessel 10 of FIGURE 1 with contact vessel 10 rotated 90°.

In the contacting of two immiscible liquids, the liquid having the greater density is passed via conduit means 22 upwardly into contact vessel 10. The other liquid is passed via conduit means 23 and dispersing means 24 upwardly through the center vertical compartment in intimate contact with the liquid of greater density in the illustrated manner. As the immiscible mixture passes upwardly through contact vessel 10 and into the region immediately above baffle plate members 19, separation of the immiscible liquid mixture is effected. Aided by baffle member 18, the liquid having the greater density is separated from the upwardly flowing mixture and returned to the lower region of contact vessel 10 by flowing downwardly through the side vertical compartments. The separated liquid of less density flows through openings 27 in baffle plate member 18, continuing upwardly through contact vessel 10 and passing from contact vessel 10 via conduit means 20. Upon reaching the bottom of the vertical contact vessel 10, the liquid of greater density circulates from the vertical side compartments into the vertical center compartment in the illustrated manner, thereby providing a continuous circulating liquid stream.

Preferably, vertical baffle plate members 19 are so positioned within the lower region of contact vessel 10 so as to obtain the optimum mass velocity of the upwardly flowing immiscible liquid mixture. This is to say that vertical baffle plate members 19 are so positioned so that the pressure drop incurred in the center vertical compartment is equal to the pressure drop within the side vertical compartments. In the intimate mixing of the immiscible liquid phases, it is desirous that the pressure drop in the two outside vertical chambers be substantially equivalent. To this end, a support member 28 is attached to dispersing means 24 so that the interior structure of the contact zone in the lower region of contact vessel 10 is symmetrical.

Conventional means of supporting the U-tube bundle within the shell are not herein illustrated. If desired, the U-tube bundle can be supported by a grid member positioned between flanged head 21 and flanged shell 11.

The vertical baffle members 19 could also be supported by this grid member and the vertical positioning of the vertical baffle members maintained by conventional tie rods positioned between this grid member and baffle member 18.

Vessel 10 can be utilized as an effective contact vessel or reactor by maintaining a desired level of an immiscible liquid within the lower region of contact vessel 10. An immiscible liquid of less density is then passed via conduit means 23 and dispersing means 24 to the center vertical chamber of vessel 10. The region above vertical baffle plate members 19 will thus serve to effectively separate the upwardly flowing immiscible liquid mixture in the heretofore described manner.

It is also within the scope of this invention to continuously pass an immiscible liquid via conduit means 22 to vessel 10 and to continuously pass an immiscible liquid of less density to vessel 10 via conduit means 23 and dispersing means 24, thereby maintaining contact vessel 10 liquid full. A continuously circulating immiscible liquid stream is maintained within vessel 10, said circulating liquid stream comprised of the immiscible liquid having the greater density.

Passing a heat exchange medium through U-tubes 12 provides a means of controlling the temperature of the contact zone and provides a means of controlling the temperature of the circulating liquid stream in the side vertical compartments. The control of the temperature of the contact zone is of particular importance wherein the contact of two immiscible liquids results in highly exothermic reaction, as in an alkylation process.

To more fully describe my invention, the following example is presented employing the inventive apparatus for the alkylation reaction between an olefin and an isoparaffin in the presence of a hydrogen fluoride catalyst. The process conditions are presented as being typical and are not to be construed to limit my invention unduly.

*Example*

A hydrocarbon feed stream comprising a mixture of olefin, isobutane and recycle feeds of the following composition:

| Composition | Olefin (Vol. Percent) | Isobutane (Vol. Percent) | Recycle (Vol. Percent) |
|---|---|---|---|
| Ethane | | .09 | |
| Propylene | 14.59 | | |
| Propane | 14.51 | 1.51 | 3.68 |
| Isobutane | 17.38 | 94.27 | 91.02 |
| Butylenes | 34.58 | | |
| n-Butane | 18.34 | 3.83 | 5.3 |
| Isopentane | .31 | .30 | |
| n-Pentane | .09 | | |
| Amylenes | .20 | | | was passed at the rate of 2715 b.p.s.d. (barrels per stream day), 1091 b.p.s.d., and 13.089 b.p.s.d., respectively, via conduit means 23 to contact vessel 10. 92 weight percent hydrofluoric acid was passed continuously through conduit means 22 at a temperature of 93° F. and at the rate of 9272 b.p.s.d., thereby maintaining an acid to hydrocarbon feed ratio of 0.54 to 1. The acid to hydrocarbon ratio within contact vessel 10 was 1.90.

The pressure within contact vessel 10 was 165 p.s.i.g. The temperature within the lower region of the center vertical contact chamber was 110° F.; the temperature immediately above the vertical baffle plate members 19 was 94° F.; and the temperature of the hydrocarbon and hydrofluoric acid mixture passing from contact vessel 10 via conduit means 20 was 93° F.

The contact vessel effluent mixture was passed to a settling zone, not shown, where the acid and hydrocarbon were separated into lower and upper phases, respectively. The hydrocarbon phase was fractionated to recover alkylate and an unreacted isobutane fraction which comprises the previously described recycle stream to contact vessel 10. 2360 b.p.s.d. of alkylate was recovered from the fractionation zone. 355 b.p.s.d. of a butane fraction and 418 b.p.s.d. of a propane fraction having the following compositions:

| Composition | Propane fraction, volume percent | Butane fraction, volume percent |
|---|---|---|
| Ethane | .02 | |
| Propane | 99.07 | |
| Isobutane | .91 | 8.60 |
| Butylenes | | .12 |
| n-Butane | | 90.95 |
| Amylenes | | .33 | were recovered from the fractionation zone.

The effectiveness of the inventive contact vessel is clearly demonstrated. Although the inventive contact vessel was employed in a highly exothermic catalytic alkylation process, substantial removal of the exothermic heat was obtained in that the temperature of the lower region of the contact zone was 110° F., compared with a feed inlet temeprature of 94° F. The effectiveness of contact vessel 10 to intimately contact the immiscible hydrofluoric acid and hydrocarbon feeds is clearly demonstrated in the production of 2360 b.p.s.d. of alkylate from an olefin fed stream of the above described composition.

The method of this invention can be employed in carrying out processes wherein immiscible liquids are contacted and/or reacted such as in polymerization and various sweetening operations. The apparatus of this invention can be employed in any process wherein immiscible liquids are contacted and then separated. For example, the apparatus can be employed in copper sweetening, amine treating, caustic washing, etc., and in other liquid-liquid operations.

While the inventive apparatus has been described as employing the heat exchange means of the apparatus for cooling purposes, said heat exchange means can be employed for heating purposes, if desired.

As will be evident to those skilled in the art, various modifications of this invention can be made, or followed, in the light of the foregoing disclosure and discussion without departing from the spirit or the scope thereof.

I claim:

1. A contacting apparatus comprising an elongated vertical shell, a U-tube bundle disposed within said shell through substantially its entire length and opening into inlet and outlet zones disposed at and closing the top of said shell, a head member closing the bottom of said shell, vertical baffle members positioned within said shell so as to form a center and two side vertical compartments, said center and each of said side vertical compartments in open communication at the top and bottom of said vertical baffle members, each of said vertical compartments containing a portion of said U-tube bundle disposed therein, a lower shell inlet means, an upper shell outlet means, a means for introducing a fluid into said center vertical compartment, and a conduit inlet means communicating with said means for introducing.

2. The apparatus of claim 1 to include a horizontal baffle disposed within said shell and above said vertical baffle members, thereby forming an immiscible liquid separation zone between said vertical baffle members and said horizontal baffle.

3. The apparatus of claim 2 to include additional baffles disposed above said horizontal baffle so that a fluid flowing within said shell and above said horizontal baffle will describe a tortuous path.

4. A contacting apparatus comprising an elongated vertical shell, a U-tube bundle disposed within said shell through substantially its entire length and opening into inlet and outlet zones disposed at and closing the top of said shell, a head member closing the bottom of said shell and defining a confined zone, vertical baffle members positioned within said shell so as to form a center and two side vertical compartments, said center and each of said side vertical compartments in open communication at the top of said vertical baffle members, each of said vertical compartments containing a portion of said U-tube bundle disposed therein, said vertical baffle members extending downwardly into said confined zone, said head member and each of said vertical baffle members defining a channel of fluid flow through said confined zone and between said center vertical compartment and each of said side vertical compartments, a lower shell inlet means, an upper shell outlet means, means for introducing a fluid into said center vertical compartment, and a conduit inlet means communicating with said means for introducing.

5. The apparatus of claim 4 to include a horizontal baffle disposed within said shell and above said vertical baffle members, thereby forming an immiscible liquid separation zone between said vertical baffle members and said horizontal baffle.

6. The apparatus of claim 5 wherein said means for introducing comprises means for dispersing a fluid substantially throughout the cross section of said center vertical compartment.

7. The apparatus of claim 6 wherin the pressure drop in said center vertical compartment is substantially equal to the pressure drop in each of said side vertical compartments.

8. The apparatus of claim 6 to include additional baffles disposed above said horizontal baffle so that a fluid flowing within said shell and above said horizontal baffle will describe a tortuous path.

References Cited by the Examiner
UNITED STATES PATENTS

| 2,855,449 | 10/58 | Owen | 260—683.58 |
| 3,105,102 | 9/63 | Webb | 260—683.58 |
| 3,108,048 | 10/63 | McDonald | 260—683.58 X |
| 3,133,128 | 5/64 | McDonald | 260—683.58 |

ALPHONSO D. SULLIVAN, *Primary Examiner.*